(12) United States Patent
Jackson et al.

(10) Patent No.: US 9,047,709 B1
(45) Date of Patent: Jun. 2, 2015

(54) METHOD FOR CREATING AN ANNOTATED ANGLE WITH USER SPECIFIED POINTS, AND APPLICATIONS THEREOF

(75) Inventors: Preston Jackson, Longmont, CO (US); John Bacus, Boulder, CO (US); Paul McLean, Denver, CO (US); Jeffrey Hauswirth, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 1027 days.

(21) Appl. No.: 13/030,276

(22) Filed: Feb. 18, 2011

(51) Int. Cl.
*G06T 11/20* (2006.01)
*G06T 11/40* (2006.01)

(52) U.S. Cl.
CPC ..................................... *G06T 11/40* (2013.01)

(58) Field of Classification Search
CPC ....... G06T 11/00; G06T 11/001; G06T 11/40; G06T 11/203; G06T 17/00; G06T 11/20; G06T 15/00
See application file for complete search history.

(56) References Cited

U.S. PATENT DOCUMENTS

| 8,487,889 | B2 * | 7/2013 | King | 345/173 |
| 2001/0018644 | A1 * | 8/2001 | Schwalb et al. | 703/7 |
| 2005/0102063 | A1 * | 5/2005 | Bierre | 700/247 |
| 2007/0084861 | A1 * | 4/2007 | Epstein et al. | 219/765 |
| 2009/0256846 | A1 * | 10/2009 | Zahariev | 345/440 |

* cited by examiner

*Primary Examiner* — Mark Zimmerman
*Assistant Examiner* — Michelle Chin
(74) *Attorney, Agent, or Firm* — Sheridan Ross P.C.

(57) ABSTRACT

Systems, methods and articles of manufacture for creating an annotated angle with the user specified points are described herein. Embodiments of the present invention relate to reducing or eliminating the effort a user must put forth in creating an angular dimension by drawing two explicit lines or two explicit objects comprised of two lines where either the user would have to ensure the explicit lines intersected to form the angular dimension or define an exact center point to be the vertex of the angular dimension. Further embodiments allow a user to easily create the annotated angle by defining points in the CAD interface eliminating the need to create line geometry with the defined center point in the CAD interface. In one embodiment, this is achieved by the user specifying a start point, a start direction, an end point, and an end direction where the annotated angle may then be created based on the user defined points in the CAD interface.

20 Claims, 8 Drawing Sheets

METHOD FOR CREATING AN ANNOTATED ANGLE WITH USER SPECIFIED POINTS, AND APPLICATIONS THEREOF

FIELD

The field generally relates to computer drafting tools operating through user interfaces and applications thereof.

BACKGROUND

In a computer aided design (CAD) interface, drafting applications provide a user an ability to draw and annotate an angle. The angle is a figure formed by two non-parallel lines or line segments where the two lines ultimately extend so that the two lines intersect at a point creating a vertex. The angular dimension is an annotation of the angle comprising of two extension lines and an arc located some distance from the vertex of the angle sweeping the annotated angle. In addition, a textual display of the size of the angular dimension is typically displayed in the CAD interface with the annotated angle.

Many CAD applications are limited to creating annotated angles between explicit line geometry drafted in the CAD interface. These CAD applications require the user to draw two explicit lines or two explicit objects comprised of two lines in the CAD interface. If the user draws the two explicit lines so the two explicit lines intersect, then the intersection of the two explicit lines forms the vertex creating the angle. The CAD interface can then annotate the angle with the angular dimension. If the user simply draws two explicit lines that do not explicitly intersect on the CAD interface, the user must then define an exact center point to be the vertex of the angle. With the two lines drawn by the user and the exact designation of the vertex of the angle, the CAD application can create the angle and annotate the angle with the angular dimension between the two explicit lines with the user defined vertex.

BRIEF SUMMARY

Embodiments of the present invention relate to drafting annotated angles. In a first embodiment, a computer implemented method provides a user interface a capability to form an annotated angle from a plurality of points where each point is specified by a user. A first point is received by the user interface that is specified by a user where the first point specifies a start point. A second point is received by the user interface that is specified by the user where the second point specifies a start direction. A third point is received by the user interface that is specified by the user where the third point specifies an end point. A fourth point is received by the user interface that is specified by the user where the fourth point specifies an end direction. A vertex is calculated for the annotated angle based on the first point, the second point, the third point, and the fourth point. A first line is generated from the vertex to the start point and a second line from the vertex to the end point where the first line and the second line are of equal length. A fifth point is received by the user interface that is specified by the user where the fifth point specifies a length from the vertex to the fifth point. A first extension line of the first line is generated in the same direction as the first line where the length of the first line and first extension line is equal to the length from the vertex to the fifth point. A second extension line of the second line is generated in the same direction as the second line where the length of the second line and extension line is equal to the length from the vertex to the fifth point. The annotated angle is displayed on the user interface.

In a second embodiment, a system provides a user interface a capability to form an annotated angle from a plurality of points where each point is specified by a user. A receiving module receives a first point specified by a user where the first point specifies a start point. The receiving module receives a second point specified by the user where the second point specifies a start direction. The receiving module receives a third point specified by the user where the third point specifies an end point. The receiving module receives a fourth point specified by the user where the fourth point specifies an end direction. The receiving module receives a fifth specified point by the user, the fifth specified point specifies a length from the vertex to the fifth point. A generation module generates a first line from the vertex to the start point and a second line from the vertex to the end point where the first line and the second line are of equal length. The generation module generates a first extension line of the first line in the same direction as the first line where the length of the first line and first extension line is equal to the length from the vertex to the fifth point. The generation module generates a second extension line of the second line in the same direction as the second line where the length of the second line and extension line is equal to the length from the vertex to the fifth point. A calculation module calculates a vertex for the annotated angle based on the first point, the second point, the third point, and the fourth point. A display module displays the annotated angle on the user interface.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. These figures are intended to be illustrative, not limiting.

DETAILED DESCRIPTION

In embodiments, a user interface may provide a capability to draw an annotated angle based on user specified points in the user interface. In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Three User Specified Points

Figure 1:
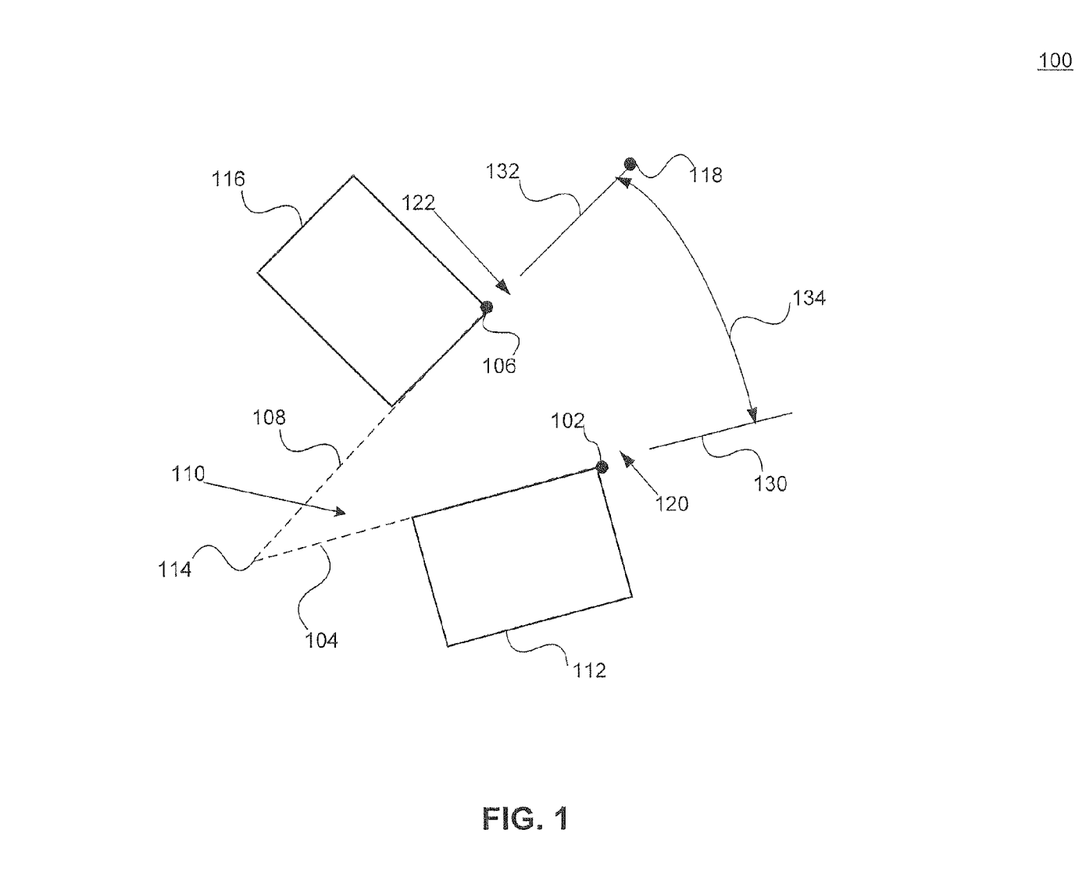
FIG. 1 illustrates an annotated angle created by three user specified points, according to one embodiment.

FIG. 1 illustrates a CAD interface system 100 with an annotated angle created by three user specified points according to an embodiment. A first user specified point defines a start point 102 for annotated angle 110. A second user specified point defines an end point 106 for annotated angle 110. A third user specified point specifies an extension line length point 118 that defines a length for extension lines 132 and 130. Vertex 114 and lines 104 and 108 of annotated angle 110 may be generated from start point 102, end point 106, and extension line length point 118. Offsets 122 and 120 may be gaps between extension lines 132 and 130 and start point 102 and end point 106. Rectangles 112 and 116 may be existing geometry in CAD interface 100. Dimension line 134 extends between extension lines 132 and 130.

In an embodiment, a user may draft annotated angle 110 by specifying three points in CAD interface 100. In such an embodiment, a user specifies start point 102, end point 106, and extension line length point 118. A user may not be required to specify a start direction and an end direction. When a user specifies start point 102, a start direction may be inferred from start point 102. Also, when a user specifies end point 106, an end direction may be inferred from end point 106. Based on start point 102 with an inferred start direction, end point 106 with an inferred end direction, and extension line length point 118, annotated angle 110 may be created and displayed in CAD interface 100.

Annotated angle 110 may be defined as two lines 104 and 108 meeting in vertex 114. To create lines 104 and 108, start point 102 and end point 106 may be required. Start point 102 defines a start position for annotated angle 110 that determines the starting position of a first line 104 required to create annotated angle 110. In an embodiment, a user specifies in CAD interface 100 where a user wishes the first line 104 required to create annotated angle 110 to begin and specifies at that position start point 102. In a further embodiment, CAD interface 100 may be updated with a marker indicating start point 102.

Creation of line 104 also requires both start point 102 for line 104 and a direction for line 104 to extend from start point 102. Rather than a user specifying an actual direction for line 104 to extend, an embodiment infers the direction for line 104 based on actions of a user. In an embodiment, the user hovers a cursor in CAD interface 100 in a location that specifies the direction that line 104 may extend. Line 104 extends from start point 102 into the direction of the location in CAD interface 100 that the user has hovered the cursor. In another embodiment, the user specifies start point 102 on an existing line existing in CAD interface 100, e.g., side of rectangle 112. Based on where the user specified start point 102 on side of rectangle 112, direction of line 104 from start point 102 may be inferred to extend along the side of rectangle 112. In a further embodiment, CAD interface 100 may be updated with line 104 extending off the page indicating the inferred start direction for line 104.

Annotated angle 110 may be defined as two lines 104 and 108 meeting in vertex 114. To create lines 104 and 108, start point 102 and end point 106 may be required. End point 106 defines an end position for annotated angle 110 that determines the starting position of a second line 108 required to create annotated angle 110. In an embodiment, a user specifies in CAD interface 100 where the user wishes the second line 108 required to create annotated angle 110 to begin and specifies at that position end point 106. In an embodiment, CAD interface 100 may be updated with a marker indicating end point 106.

Creation of line 108 also requires both end point 106 for line 108 and a direction for line 108 to extend from end point 106. Rather than the user specifying an actual direction for line 108 to extend, an embodiment infers the direction for line 108 based on actions of the user. In an embodiment, the user hovers a cursor in CAD interface 100 in a location that specifies the direction that line 108 may extend. Line 108 extends from end point 106 into the direction of the location in CAD interface 100 that the user has hovered the cursor. In another embodiment, the user specifies end point 106 on an existing line existing in CAD interface 100, e.g., side of rectangle 116. Based on the user specifying end point 106 on side of rectangle 116, direction of line 108 from end point 106 may be inferred to extend along the side of rectangle 116. In a further embodiment, CAD interface 100 may be updated with line 108 extending off the page indicating the inferred end direction for line 108.

Once start point 102 with an inferred start direction and end point 106 with an inferred end direction established, vertex 114 of annotated angle 110 may be calculated. Annotated angle 110 may be defined as two lines 104 and 108 meeting in vertex 114. After start point 102 with an inferred direction may be specified, line 104 may extend infinitely in the inferred direction. After end point 106 with an inferred direction may be specified, line 108 may extend infinitely in the inferred direction. As would be appreciated by one having ordinary skill in the relevant art, given the description herein, unless lines 104 and 108 are parallel lines, lines 104 and 108 must intersect at least in Euclidean geometry. At the intersection point of lines 104 and 108, vertex 114 for annotated angle 110 may be calculated. The user may not be required to explicitly draw lines 104 and 108 in CAD interface 100 so that lines 104 and 108 explicitly intersect in CAD interface 100. In an embodiment, CAD interface 100 may be updated displaying annotated angle 110 with markers representing start point 102 and end point 104 with lines 104 and 108 beginning at vertex 114 and terminating at start point 102 and end point 104.

As would be appreciated by one having skill in the relevant art, given the description herein, lines 104 and 108 may be represented in several different embodiments. For example, lines 104 and 108 may be dotted as shown in FIG. 1. In a second example, lines 104 and 108 may be solid lines. In a third example, lines 104 and 108 may terminate at vertex 114 as shown in FIG. 1. In a fifth example, lines 104 and 108 may extend beyond vertex 114. In a sixth example, lines 104 and 108 may not be visible in CAD interface 100.

Following the specification of start point 102 and end point 106, the user may define the length of extension lines 130 and 132 by specifying extension line length point 118. The user specifies the length of extension lines 130 and 132 by specifying extension line length point 118. In an embodiment, the user may not be limited to specifying extension line length point 118 separately on line 104 and then specifying extension line length point 118 on line 108. The user may specify a single extension line length point 118 for both extension lines 130 and 132 by specifying extension line length point 118 in CAD interface 100. In specifying extension line length point 118, a value may be defined that equals the distance from extension line length point 118 to vertex 114. Based on the value that equals the distance from extension line length point 118 to vertex 114, extension line 130 extends from start point 102 to the value that equals the distance from extension line length point 118 to vertex 114 along line 104. Extension line 132 extends from end point 106 to the value that equals the distance from extension line length point 118 to vertex 114 along line 108.

As would be appreciated by one having skilled in the relevant art given the description herein, the length of extension line 130 may be the difference between the distance from extension line length point 118 to vertex 114 and the distance of start point 102 from vertex 114. Similarly, the length of extension line 132 may be the difference between the distance from extension line length point 118 to vertex 114 and the distance of end point 106 from vertex 114.

In an embodiment, extension line 130 may offset from start point 102, and extension line 132 may offset from end point 106. Offset 120 defines a gap between extension line 130 and start point 102. Offset 122 defines the gap between extension line 132 and end point 106. As a result, extension line 130 does not extend to start point 102 and extension line 132 does not extend to end point 106 but may rather be separated by offsets 120 and 122. In an embodiment, offsets 120 and 122 may be determined by CAD interface 100. In another embodiment, offsets 120 and 122 may be changed by the user. Embodiments including dimension line 134 are discussed in greater detail below.

Four User Specified Points

Figure 2:
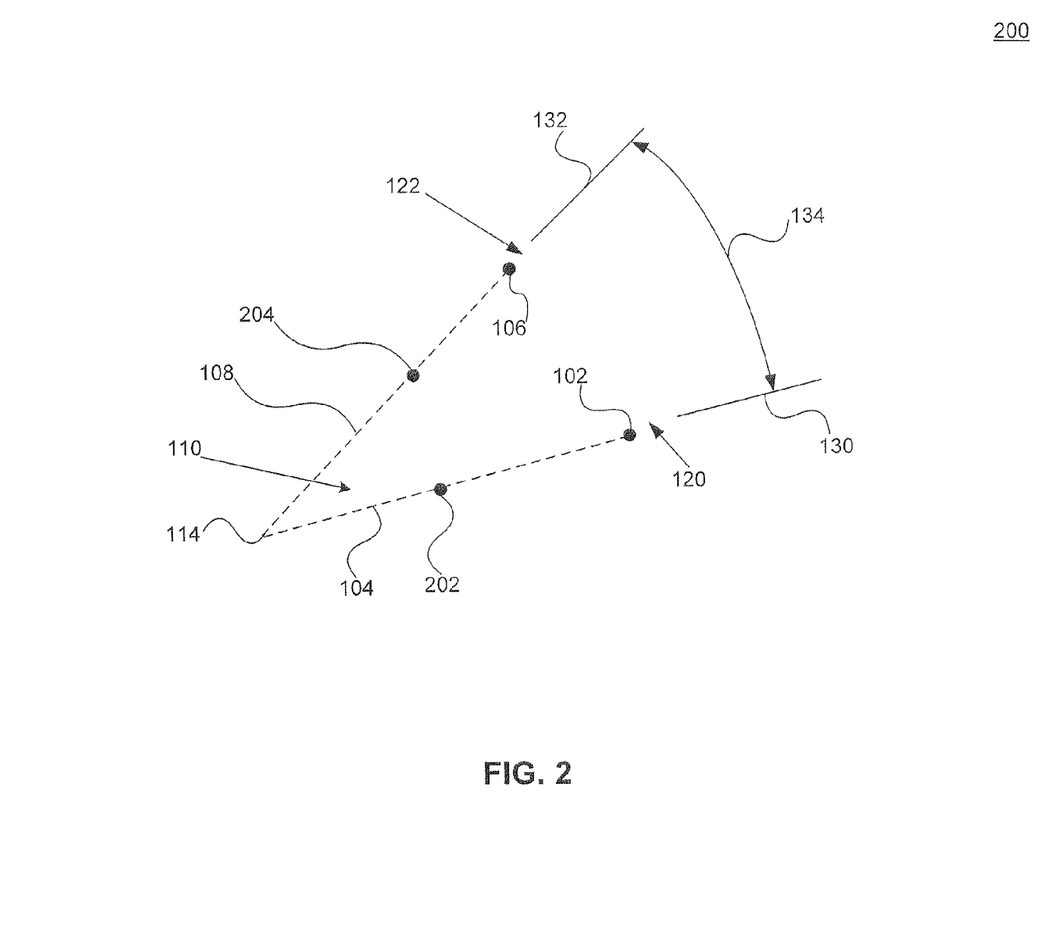
FIG. 2 illustrates an annotated angle created by four user specified points, according to one embodiment.

FIG. 2 illustrates a CAD interface 200 to annotate an angle with four user specified points according to an embodiment. A first user specified point defines a start point 102 for annotated angle 110. A second user specified point defines a start direction 202 for annotated angle 110. A third user specified point defines an end point 106 for annotated angle 110. A fourth specified point defines an end direction 204. Vertex 114 and lines 104 and 108 of annotated angle 110 may be generated from start point 102, start direction 202, end point 106, and end direction 204. Offsets 122 and 120 may be gaps between extension lines 132 and 130 and start point 102 and end point 106. Dimension line 134 extends between extension lines 132 and 130.

In an embodiment, a user may draft annotated angle 110 by specifying four points in CAD interface 100. In such an embodiment, the user specifies start point 102, start direction 202, end point 106, and end direction 204. A user may not be required to specify an extension line length. When a user specifies end direction 204, a length of extension lines 130 and 132 may be inferred from end direction 204. Based on start point 102, start direction 202, end point 106 and end direction 204 with inferred length of extension lines 130 and 132, annotated angle 110 may be created and displayed in CAD interface 200.

Annotated angle 110 may be defined as two lines 104 and 108 meeting in vertex 114 to create lines 104 and 108. Start point 102, start direction 202, end point 106, and end direction 204 may be required. Start point 102 defines a start position for annotated angle 110 that determines the starting position of a first line 104 required to create annotated angle 110. In an embodiment, a user specifies in CAD interface 200 where a user wishes the first line needed to create annotated angle 110 may begin and specifies at that position start point 102 to create line 104. In a further embodiment, CAD interface 200 may be updated with a marker indicating start point 102. Both start point 102 for line 104 and a direction for line 104 to extend from start point 102 may be required. User may specify the direction for line 104 by specifying start direction 202. In an embodiment, CAD interface 200 may be updated with line 104 extending off the page indicating the start direction for line 104. With start point 102 and start direction 202 defined for line 104, line 104 extends from start point 102 into the direction of start direction 202.

Annotated angle 110 may be defined as two lines 104 and 108 meeting in vertex 114 to create lines 104 and 108. Start point 102, start direction 202, end point 106, and end direction 204 may be required. End point 106 defines an end position for annotated angle 110 that determines the starting position of a second line 108 required to create annotated angle 110. In an embodiment, the user specifies in CAD interface 200 where the user wishes the second line 108 required to create annotated angle 110 may begin and specifies at that position end point 106. In an embodiment, CAD interface 200 may be updated with a marker indicating end point 106. To create line 108, both end point 106 for line 108 and a direction for line 108 to extend from end point 106 may be required. The user may specify the direction for line 108 by specifying end direction 204. In an embodiment, CAD interface 200 may be updated with line 108 extending off the page indicating the end direction for line 108. With end point 106 and end direction 204 defined for line 108, line 108 extends from end point 106 into the direction of end direction 204.

Once start point 102 with start direction 202 and end point 106 with end direction 204, vertex 114 of annotated angle 110 may be calculated. Annotated angle 110 may be defined as two lines 104 and 108 meeting in vertex 114. After start point 102 with start direction 202 specified, line 104 extends infinitely from start point 102 in start direction 202. After end point 106 with end direction 204 is specified, line 108 extends infinitely from end point 106 in end direction 204. As would be appreciated by one having skill in the relevant art, given the description herein, unless lines 104 and 108 are parallel lines, lines 104 and 108 must intersect at least in Euclidean geometry. At the intersection point of lines 104 and 108, vertex 114 for annotated angle 110 may be calculated. The user may not be required to explicitly draw lines 104 and 108 in CAD interface 200 so that lines 104 and 108 explicitly intersect in CAD interface 200. In an embodiment, CAD interface 200 may be updated displaying annotated angle 110 with markers representing start point 102 and end point 104 with lines 104 and 108 beginning at vertex 114 and terminating at start point 102 and end point 104.

As would be appreciated by one having skill in the relevant art, given the description herein, lines 104 and 108 may be represented in several different embodiments. For example, lines 104 and 108 may be dotted as shown in FIG. 2. In a second example, lines 104 and 108 may be solid lines. In a third example, lines 104 and 108 may terminate at vertex 114 as shown in FIG. 2. In a fifth example, lines 104 and 108 may extend beyond vertex 114. In a sixth example, lines 104 and 108 may not be visible in CAD interface 200.

The user specifies the length of extension lines 130 and 132 by implementing a previously used length for extension lines 130 and 132 in a previously created annotated angle 110. In an embodiment, length of extension lines 130 and 132 may be determined by implementing a previous length of extension lines 130 and 132 specified by the user in CAD interface 200 for a previously created annotated angle. In such an embodiment, the user double clicks in CAD interface 200 when specifying end direction 204 and then lengths of extension lines 130 and 132 may be created based on a previous length of extension lines 130 and 132 for a previously created annotated angle 110. In another embodiment, length of extension lines 130 and 132 may be determined by CAD interface 200. In such an embodiment, the user double clicks in CAD interface 200 when specifying end direction 204 and then lengths of extension lines 130 and 132 may be specified based on a setting determined by CAD interface 200.

In an embodiment, extension line 130 may offset from start point 102 and extension line 132 may offset from end point 106. Offset 120 defines a gap between extension line 130 and start point 102. Offset 122 defines the gap between extension line 132 and end point 106. As a result, extension line 130 does not extend to start point 102 and extension line 132 does not extend to end point 106 but are rather separated by offsets 120 and 122. In an embodiment, offsets 120 and 122 are determined by CAD interface 100. In another embodiment, offsets 120 and 122 may be changed by the user. In another embodiment, offsets 120 and 122 may be copied from the previous offsets implemented by the user in CAD interface 200. Embodiments including dimension line 134 is discussed in greater detail below.

As would be appreciated by one having skilled in the relevant art given the description herein, further embodiments creating annotated angle 114 based on four user specified points may include creating annotated angle 114 based on start point 102 with inferred start direction, end point 106, end direction 204 and extension line length point 118. Annotated angle 114 may also be created based on start point 102, start direction 204, end point 106 with inferred end direction and extension line length point 118.

Five User Specified Points

Figure 3:
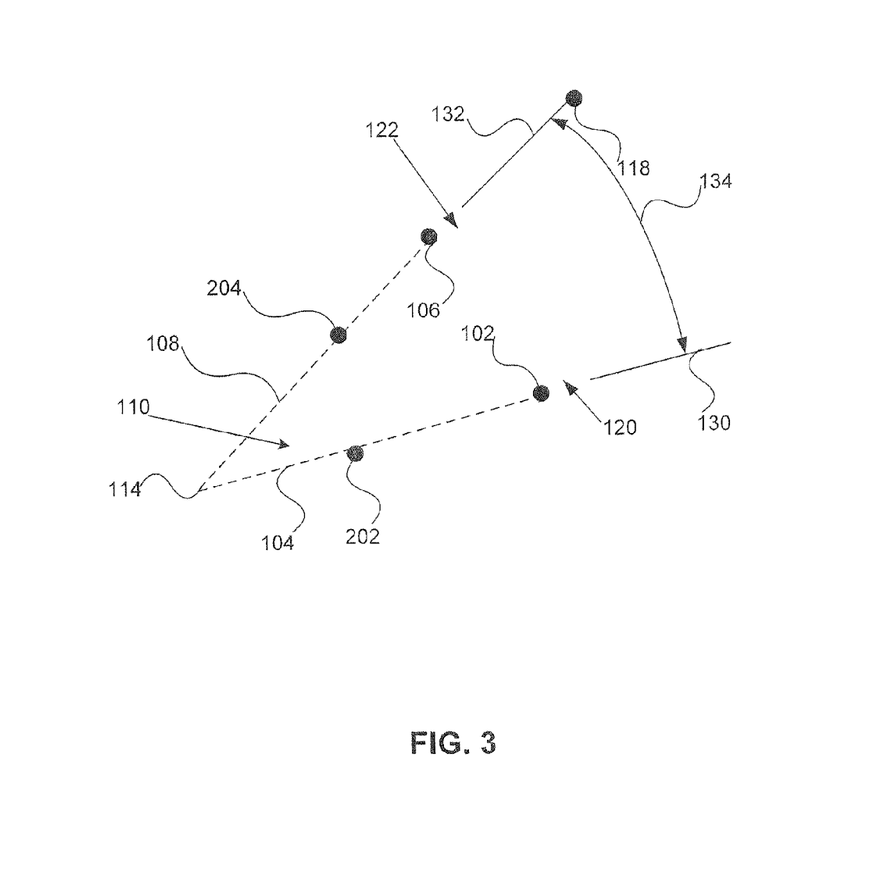
FIG. 3 illustrates an annotated angle created by five user specified points, according to one embodiment.

FIG. 3 illustrates CAD interface 300 to annotate an angle based on the user specified points according to an embodiment. A first user specified point defines a start point 102 for annotated angle 110. A second user specified point defines a start direction 202 for annotated angle 110. A third user specified point defines an end point 106 for annotated angle 110. A fourth specified point defines an end direction 204 for annotated angle 110. A fifth specified point 118 defines a length for extension lines 132 and 130. Vertex 114 and lines 104 and 108 of annotated angle 110 may be generated from start point 102, start direction 202, end point 106, end direction 204. Offsets 122 and 120 may be the gaps between extension lines 132 and 130 and start point 102 and end point 106. Dimension line 134 extends between extension lines 132 and 130.

In an embodiment, the user may draft annotated angle 110 by specifying five points in CAD interface 300. In such an embodiment, the user specifies start point 102, start direction 202, end point 106, end direction 204, and extension line length point 118. Based on start point 102, start direction 202, end point 106, end direction 204, and extension line length point 118, annotated angle 110 may be created and displayed in CAD interface 300.

Annotated angle 110 may be defined as two lines 104 and 108 meeting in vertex 114. To create lines 104 and 108, start point 102, start direction 202, end point 106, and end direction 204 may be required. Start point 102 defines a start position for annotated angle 110 that determines the starting position of a first line 104 required to create annotated angle 110. In an embodiment, a user specifies in CAD interface 300 where the user wishes the first line 104 required to create annotated angle 110 to begin and specifies at that position start point 102. In such an embodiment, CAD interface 300 may be updated with a marker indicating start point 102. To create line 104, both start point 102 for line 104 and a direction for line 104 to extend from start point 102 may be required. A user may specify the direction for line 104 by specifying start direction 202. In an embodiment, CAD interface 300 may be updated with line 104 extending off the page indicating start direction 202 for line 104. With start point 102 and start direction 202 defined for line 104, line 104 extends from start point 102 into the direction of start direction 202.

Annotated angle 110 may be defined as two lines 104 and 108 meeting in vertex 114. To create lines 104 and 108, start point 102 and end point 106 may be required. End point 106 defines an end position for annotated angle 110 that determines the starting position of a second line 108 required to create annotated angle 110. In an embodiment, a user specifies in CAD interface 300 where the user wishes the second line 108 needed to create annotated angle 110 may begin and specifies at that position end point 106. In such an embodiment, CAD interface 300 may be updated with a marker indicating end point 106. In order to create line 108, both end point 106 for line 108 and a direction for line 108 to extend from end point 106 may be required. A user may specify the direction for line 108 by specifying end direction 204. In an embodiment, CAD interface 300 may be updated with line 108 extending off the page indicting end direction 204 for line 108. With end point 106 and end direction 204 defined for line 108, line 108 extends from end point 106 into the direction of end direction 204.

Once start point 102 with start direction 202 and end point 106 with end direction 204 have been determined, vertex 114 of annotated angle 110 may be calculated. Annotated angle 110 may be defined as two lines 104 and 108 meeting in vertex 114. After start point 102 with start direction 202 specified, line 104 extends infinitely from start point 102 in start direction 202. After end point 106 with end direction 204 specified, line 108 extends infinitely from end point 106 in end direction 204. As would be appreciated by one having skill in the relevant art, given the description herein, unless lines 104 and 108 are parallel lines, lines 104 and 108 must intersect at least in Euclidean geometry. At the intersection point of lines 104 and 108, vertex 114 for annotated angle 110 may be calculated. The user may not be required to explicitly draw lines 104 and 108 in CAD interface 300 so that lines 104 and 108 explicitly intersect in CAD interface 300. In an embodiment, CAD interface 300 may be updated displaying annotated angle 110 with markers representing start point 102 and end point 104 with lines 104 and 108 beginning at vertex 114 and terminating at start point 102 and end point 104.

As would be appreciated by one having skill in the relevant art, given the description herein, lines 104 and 108 may be represented in several different embodiments. For example, lines 104 and 108 may be dotted as shown in FIG. 3. In a second example, lines 104 and 108 may be solid lines. In a third example, lines 104 and 108 may terminate at vertex 114 as shown in FIG. 3. In a fifth example, lines 104 and 108 may extend beyond vertex 114. In a sixth example, lines 104 and 108 may not be visible in CAD interface 300.

Following the specification of start point 102 and end point 106, a user may define the length of extension lines 130 and 132 by specifying extension line length point 118. In an embodiment, the user may not be limited to specifying extension line length point 118 separately on line 104 and then specifying extension line length point 118 on line 108. The user may specify a single extension line length point 118 for both extension lines 130 and 132 by specifying extension line length point 118 in CAD interface 300. In specifying extension line length point 118, a value may be defined that equals the distance from extension line length point 118 to vertex 114. Based on the value, extension line 130 extends from start point 102 to the value that equals the distance from extension line length point 118 to vertex 114 along line 104. Extension line 132 extends from end point 106 for a distance that equals the distance from extension line length point 118 to vertex 114 along line 108.

As would be appreciated by one having skilled in the relevant art given the description herein, the length of extension line 130 may be the difference between the value that equals the distance from extension line length point 118 to vertex 114 and the distance of start point 102 from vertex 114. The length of extension line 132 may be the difference between the value that equals the distance from extension line length point 118 to vertex 114 and the distance of end point 106 from vertex 114.

In an embodiment, extension line 130 may offset from start point 102 and extension line 132 may offset from end point 106. Offset 120 defines a gap between extension line 130 and start point 102. Offset 122 defines the gap between extension line 132 and end point 122. As a result, extension line 130 does not extend to start point 102 and extension line 132 does not extend to end point 106 but are rather separated by offsets 120 and 122. In an embodiment, offsets 120 and 122 are determined by CAD interface 100. In another embodiment, offsets 120 and 122 may be changed by the user. Embodiments including dimension line 134 are discussed in greater detail below.

Dimension Line for Annotated Angle

Figure 4:
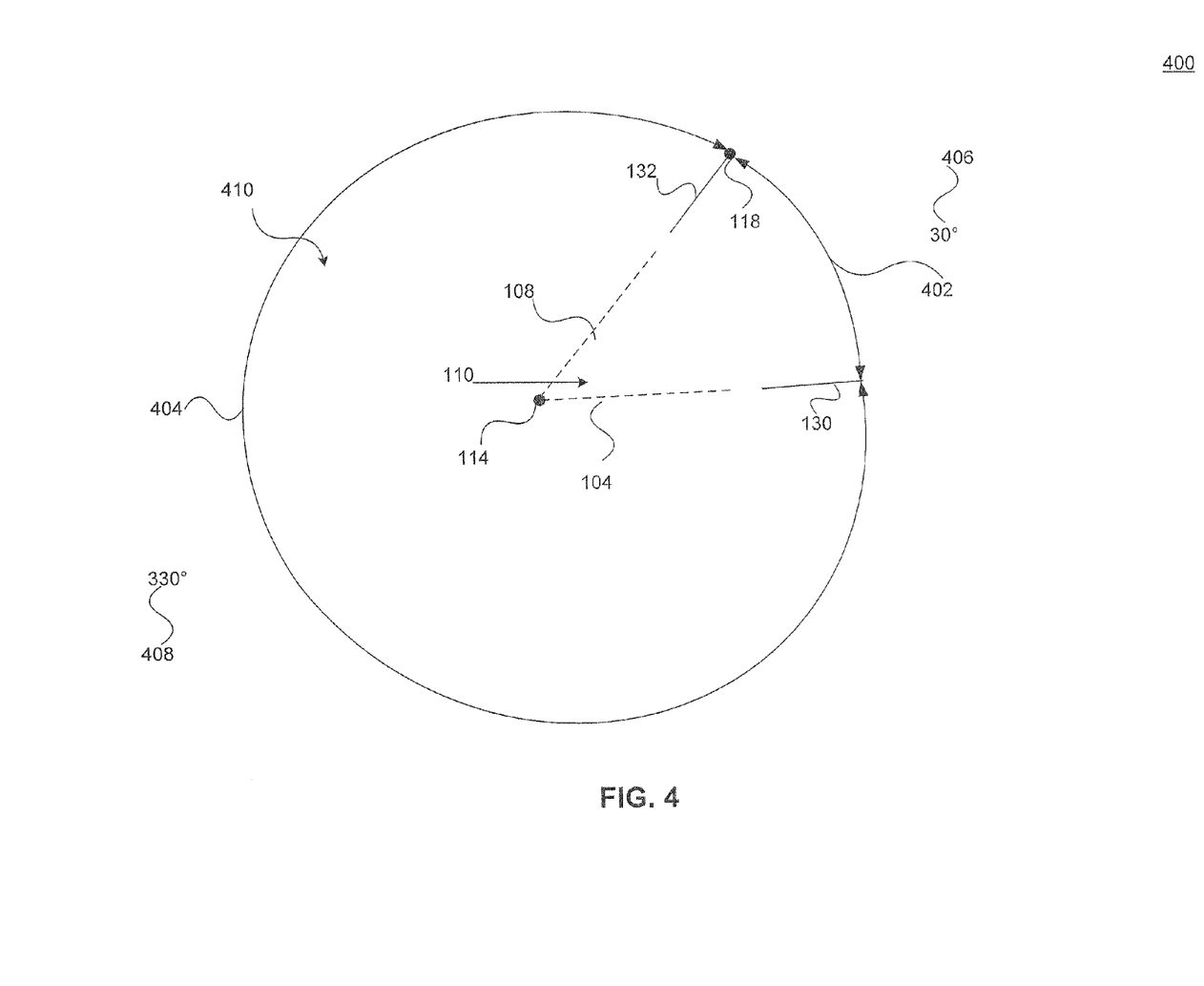
FIG. 4 illustrates an annotated angle with dimension line and size, according to one embodiment.

FIG. 4 illustrates a CAD interface 400 to annotate an angle with a dimension line, according to an embodiment. Annotated angle 110 may be formed by lines 104 and 108 intersecting in vertex 114. A user specified point 118 defines a length for extension lines 132 and 130. Acute dimension line 402 stretches between extension lines 132 and 130 following a shortest distance between extension lines 132 and 130. Obtuse dimension line 404 stretches between extension lines 132 and 130 following a longest distance between extension lines 132 and 130. Acute angular dimension size 406 displays the size of annotated angle 110 represented by acute dimension line 402. Obtuse angular dimension size 408 displays the size of obtuse annotated angle 410 represented by obtuse dimension line 404.

Acute dimension line 402 represents a measurement of the size of annotated angle 110 and obtuse dimension line 404 represents a measurement of the size of obtuse annotated angle 410. As would be appreciated by one having skilled in the relevant art given the description herein, the size of annotated angle 110 and obtuse annotated angle 410 may be the measurement between lines 104 and 108 intersecting at vertex 114 where the size of annotated angle 110 may be measured in either degrees or radians. In an embodiment, dimension lines 402 and 404 extend from extension line 130 to extension line 132 where extension line 130 and extension line 132 terminate at the value that equals the distance from extension line length point 118 to vertex 114. In another embodiment, the termination points of dimension lines 402 and 404 into extension line 130 and extension line 132 may be selected by the user. In such an embodiment, the user specifies a start extent point that determines a first termination point for dimension lines 402 and 404 on extension line 130 and the user specifies an end extent point that determines a second termination point for dimension line 402 on extension line 132.

In an embodiment, the user selects whether to implement an acute dimension line 402 or obtuse dimension line 404. As would be appreciated by one having skilled in the relevant art given the description herein, acute dimension line 402 represents the measurement of the size of annotated angle 110 that may be the measurement between lines 104 and 108 intersecting at vertex 114 that may be less than 180 degrees or Π radians. Acute dimension line 402 may be a dimension line that extends between extension line 130 and extension line 132 where acute dimension line 402 extends inside of annotated angle 110 as shown in FIG. 4. Acute dimension line 402 may be a dimension line that extends between extension line 130 and extension line 132 where acute dimension line 402 extends a shortest distance between extension line 130 and extension line 132 as shown in FIG. 4. Acute dimension line 402 represents the smallest annotated angle 110 created by the intersection of lines 104 and 108. In an embodiment, the user selects acute dimension line 402 by specifying extension line length point 118 inside of annotated angle 110.

In an embodiment, the user selects whether to implement an acute dimension line 402 or obtuse dimension line 404. As would be appreciated by one having skilled in the relevant art given the description herein, obtuse dimension line 404 represents the measurement of the size of obtuse annotated angle 410 that may be the measurement between lines 104 and 108 intersecting at vertex 114 that may be greater than 180 degrees or Π radians. Obtuse dimension line 404 may be a dimension line that extends between extension line 130 and extension line 132 where obtuse dimension line 126 extends outside of obtuse annotated angle 410 as shown in FIG. 4. Obtuse dimension line 404 may be a dimension line that extends between extension line 130 and extension line 132 where obtuse dimension line 404 extends a longest distance between extension line 130 and extension line 132 as shown in FIG. 4. Obtuse dimension line 404 represents the largest obtuse annotated angle 410 created by the intersection of lines 104 and 108. In an embodiment, the user selects obtuse dimension line 404 by specifying extension line length point 118 outside of obtuse annotated angle 410.

In an embodiment, an angular dimension size for annotated angle 110 may be displayed in CAD interface 400. An angular dimension size displays the size of annotated angle 110. Acute angular dimension size 406 displays the acute size of annotated angle 110. As would be appreciated by one skilled in the relevant art given the description herein, acute angular dimension size 406 displays the measurement of the size of annotated angle 110 that may be less than 180 degrees or Π radians. An obtuse angular dimension size 408 displays the obtuse size of obtuse annotated angle 410. As would be appreciated by one having skilled in the relevant art given the description herein, obtuse angular dimension size 408 represents the measurement of the size of obtuse annotated angle 410 that may be greater than 180 degrees or Π radians. In an embodiment, acute angular dimension size 406 and obtuse angular dimension size 408 display the size of annotated angle 110 and obtuse annotated angle 410 in degrees. In another embodiment, acute angular dimension size 406 and obtuse angular dimension size 408 display the size of annotated angle 110 and obtuse annotated angle 410 in radians.

Creation of Second Annotated Angle Based on First Annotated Angle

Figure 5:
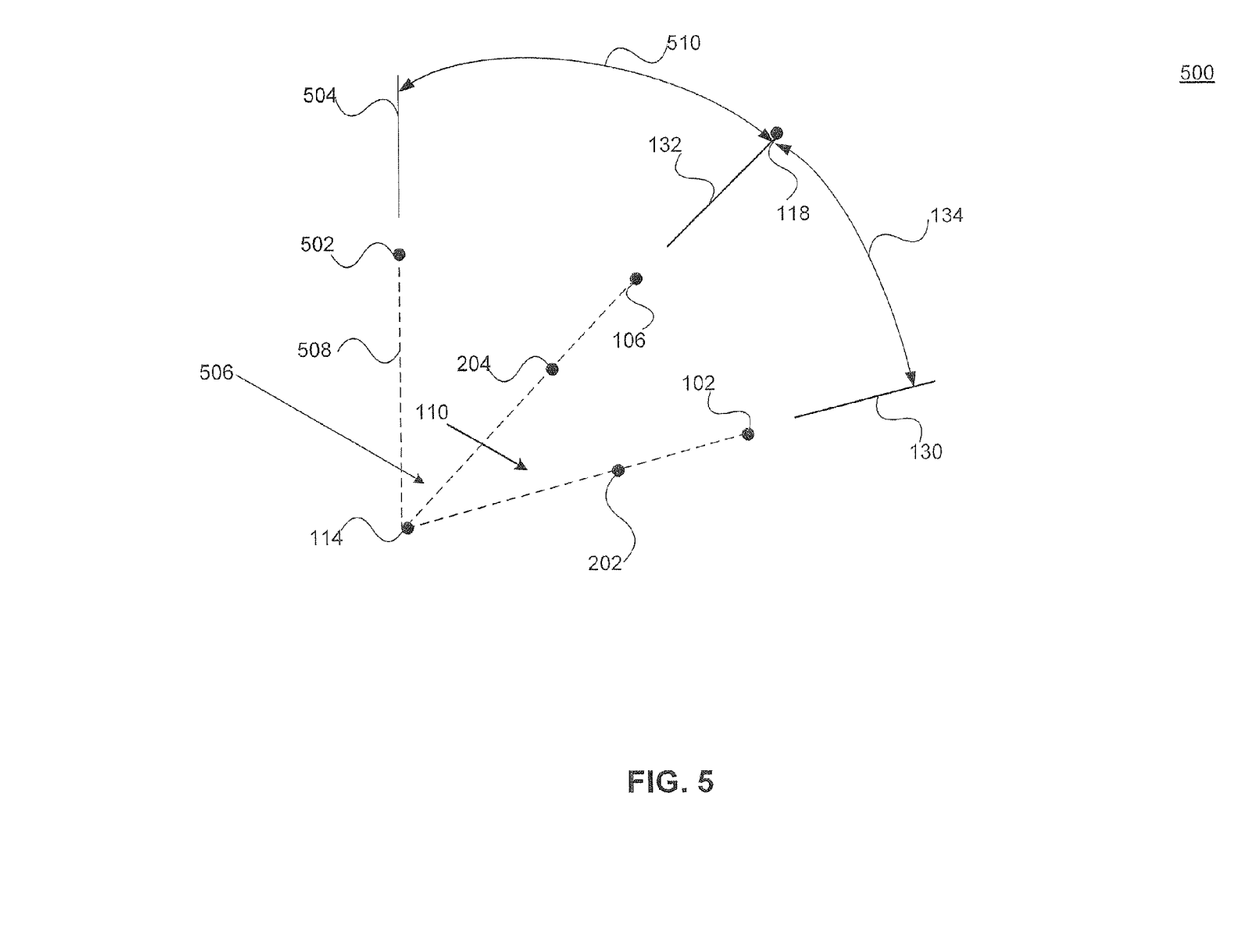
FIG. 5 illustrates a second annotated angle created based on user specified points used in creating a first annotated angle.

FIG. 5 illustrates a CAD interface 500 to create a second annotated angle based on a first annotated angle, according to an embodiment. A first user specified point defines a start point 102 for annotated angle 110. A second user specified point defines a start direction 202 for annotated angle 110. A third user specified point defines an end point 106 for annotated angle 110 and also a second start point for a second annotated angle 506. A fourth specified point defines an end direction 204 for annotated angle 110 and also a second start direction for second annotated angle 506. A fifth specified point specifies an extension line length point 118 that defines a length for extension lines 132 and 130. Vertex 114 of annotated angle 110 may be generated from start point 102, start direction 202, end point 106, end direction 204. A sixth user specified point defines a second end point 502 for second annotated angle 506. Second line 508 may be generated based on second end point 502 and vertex 114. Extension line length point 118 defines a length for a second extension line 504. Dimension line 134 extends between extension lines 132 and 130. Second dimension line 510 extends between second extension line 504 and extension line 132.

In an embodiment, second annotated angle 506 may be created based on annotated angle 110. Second annotated angle 506 may be created based on the user specified points used to create annotated angle 110 that include start point 102, start direction 202, end point 106, end direction 204 and extension line length point 118. In such an embodiment, a user completed drafting annotated angle 110 by specifying start point 102, start direction 202, end point 106, end direction 204 and extension line length point 118.

In creating second annotated angle 506 a user, following the completion of drafting annotated angle 110, may specify a point in CAD interface 500. The user specified point in CAD interface 500 following the completion of drafting annotated angle 110 becomes a second end point 502 for second annotated angle 506. End point 106 for annotated angle 110 becomes a second start point for second annotated angle 506. End direction 204 for annotated angle 110 becomes a second start direction for second annotated angle 506. Vertex 114 becomes a second vertex for second annotated angle 506. With vertex 114 acting as a second vertex for second annotated angle 506 coupled with second end point 502, an end direction may be defined for second annotated angle 506 because vertex 114 may be the end direction from second end point 502 for second annotated angle 506. Based on second end point 502, end point 106 becoming the second start point for second annotated angle 506, end direction 204 becoming the second start direction for second annotated angle 506, and vertex 114 becoming the second vertex for second annotated angle 506, second annotated angle 506 may be created and displayed in CAD interface 500.

Second extension line 504 may be created based on extension line length point 118 specified by the user for annotated angle 110. In specifying extension line length point 118 on opposite side of start point 102 and end point 106 from vertex 114, a value may be defined that equals the distance from extension line length point 118 to vertex 114. Based on the value that equals the distance from extension line length point 118 to vertex 114, second extension line 504 extends from second end point 502 to the value that equals the distance from extension line length point 118 to vertex 114 along line 508. Extension line 132 created by extension line length point 118 specified by the user for annotated angle 110 becomes a second extension line for second annotated angle 506.

As would be appreciated by one having skilled in the relevant art given the description herein, second annotated angle 506 may be created based on start point 102 with inferred direction, end point 106 with inferred direction, and extension line length point 118. Second annotated angle 506 may also be created based on inferred extension line length based on end direction 204. Second annotated angle 506 may also be created using start point 102 for annotated angle 110 as a second start point for second annotated angle 506.

System 600

Figure 6:
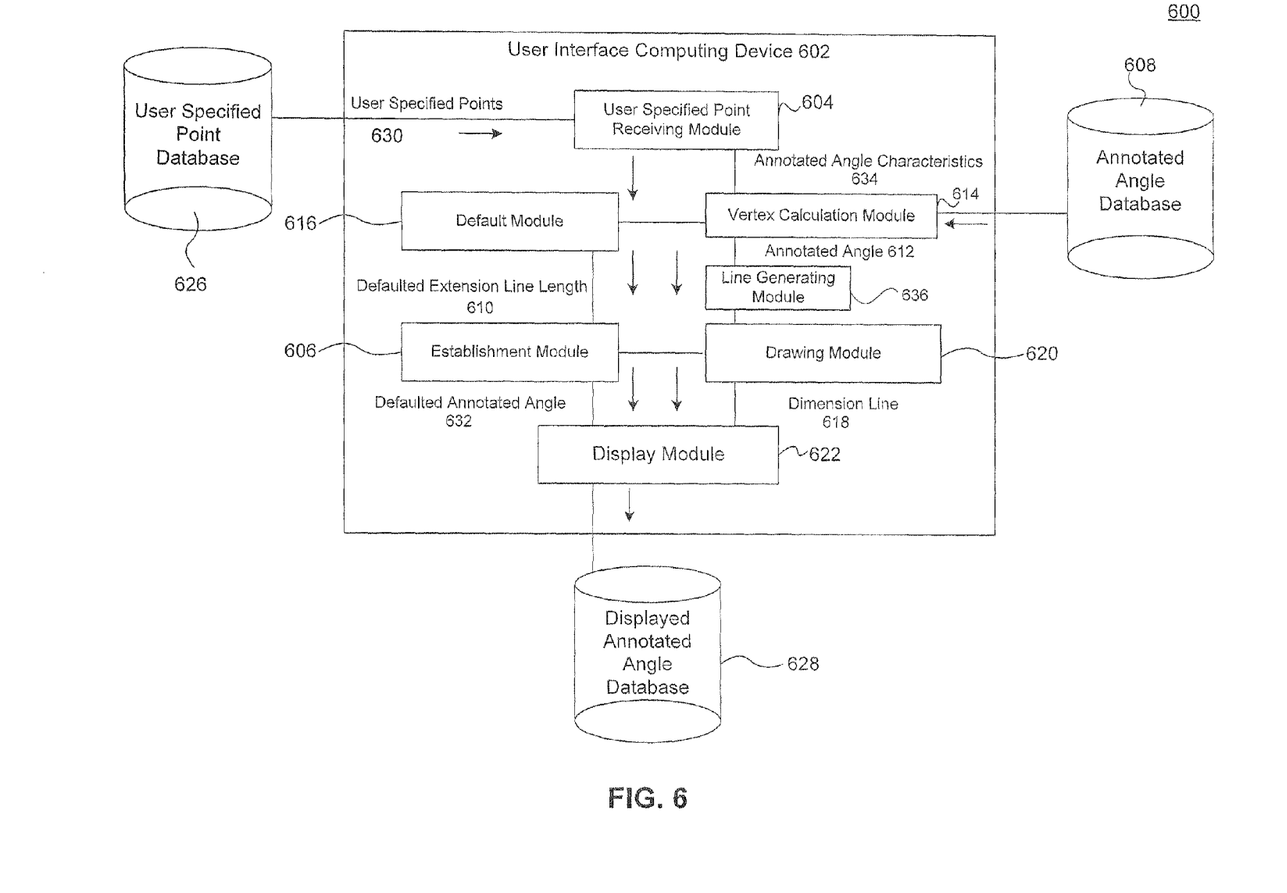
FIG. 6 illustrates a user interface computing system architecture, according to one embodiment.

FIG. 6 is an example database system architecture 600 in which embodiments of the present invention, or portions thereof, may be implemented. System architecture 600 includes the user interface computing device 602 coupled to user specified point database 626. User interface computing device 602 may also be coupled to annotated angle database 608 and displayed annotated angle database 628. While the embodiment depicted in FIG. 6 shows user interface computing device 602 connected to user specified point database 626, annotated angle database 608, and displayed annotated angle database 628, it is important to note that embodiments can be used to exchange data between a variety of different types of computer-implemented data sources, systems and architectures.

User interface computing device 602 includes user specified point receiving module 604 that receives user specified points 630. Vertex calculation module 614 calculates the vertex for annotated angle 612 based on annotated angle characteristics 634. Default module 616 creates extension lines with defaulted extension line length 610. Establishment module 606 establishes defaulted annotated angle 632 based on defaulted extension line length 610. Line generating module 636 generates lines for annotated angle 612 along with extension lines for annotated angle 612. Drawing module 620 draws dimension lines 618 for annotated angle 612. Display module 622 displays annotated angle 612 with dimension lines 618.

In general, user interface computing device 602 operates as follows. User specified point database 626 supplies a source of user specified points 630 that encompass the user specified points executed by the user in CAD interface 100 required by user interface computing device 602 to create annotated angle 612 and display in CAD interface 100. User specified point receiving module 604 receives user specified points 630 from user specified point database 626. Each of user specified points 630 received by user specified point receiving module 604 translates to annotated angle characteristics 634 that define characteristics required to build annotated angle 612.

Vertex calculation module 614 calculates a vertex for annotated angle 612 based on the annotated angle characteristics 634 determined by user specified points 630 received by user specified point receiving module 604. In an embodiment, the user specifies user specified points 630, e.g., a start point, start direction, end point, end direction, and extension line length. From the user specified points 630, annotated angle characteristics 634 may be generated, e.g., two lines that intersect forming a vertex. Vertex calculation module 614 then calculates the vertex for annotated angle 612 where annotated angle 612 may be generated. Annotated angle 612 may be stored in annotated angle database 608.

In an embodiment, vertex calculation module 614 generates annotated angle 612 defined by user specified point 630. Line generating module 636 generates two lines that intersect forming the vertex for annotated angle 612 based on annotated angle 612 generated by vertex calculation module 614. Line generating module 636 also generates extension lines for annotated angle 612 defined by user specified point 630 that specifies the length of the extension lines for annotated angle 612. Drawing module 620 receives annotated angle 612 with extension lines defined by user specified point 630 generated by vertex calculation module 614 and adds dimension line 618 to annotated angle 612. In an embodiment, dimension line 618 stretches from extension line of annotated angle 612 to the other extension line and represents a measurement of the size of annotated angle 612. Annotated angle 612 may be displayed by display module 622 with dimension lines 618. Annotated angle 612 with dimension lines 618 displayed by display module 622 may be stored in displayed annotated angle database 628.

In an embodiment, the user generates a defaulted annotated angle 632 based on annotated angle 612. In such an embodiment, the user double clicks in CAD interface 100 after specifying the final user specified point 630 required for vertex calculation module 614 to generate annotated angle 612. Default module 616 generates defaulted extension line length 610 based on the length of extension lines specified by user specified point 630 for annotated angle 612. Establishment module 606 generates defaulted annotated angle 632 based on user specified points 630 used by vertex calculation module 614 to generate annotated angle 612. Display module 622 displays both annotated angle 612 and defaulted annotated angle 632. Displayed annotated angle database 628 stores both annotated angle 612 and defaulted annotated angle 632.

Each database in system 600 may be any type of structured memory as apparent to a skilled artisan. As referred to herein, user interface computing device 602 may be any type of processing (or computing) device having one or more processors. For example, user interface computing device 602 can be a workstation, mobile device, computer, cluster of computers, set-top box, or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user interface display.

Method 700

Figure 7:
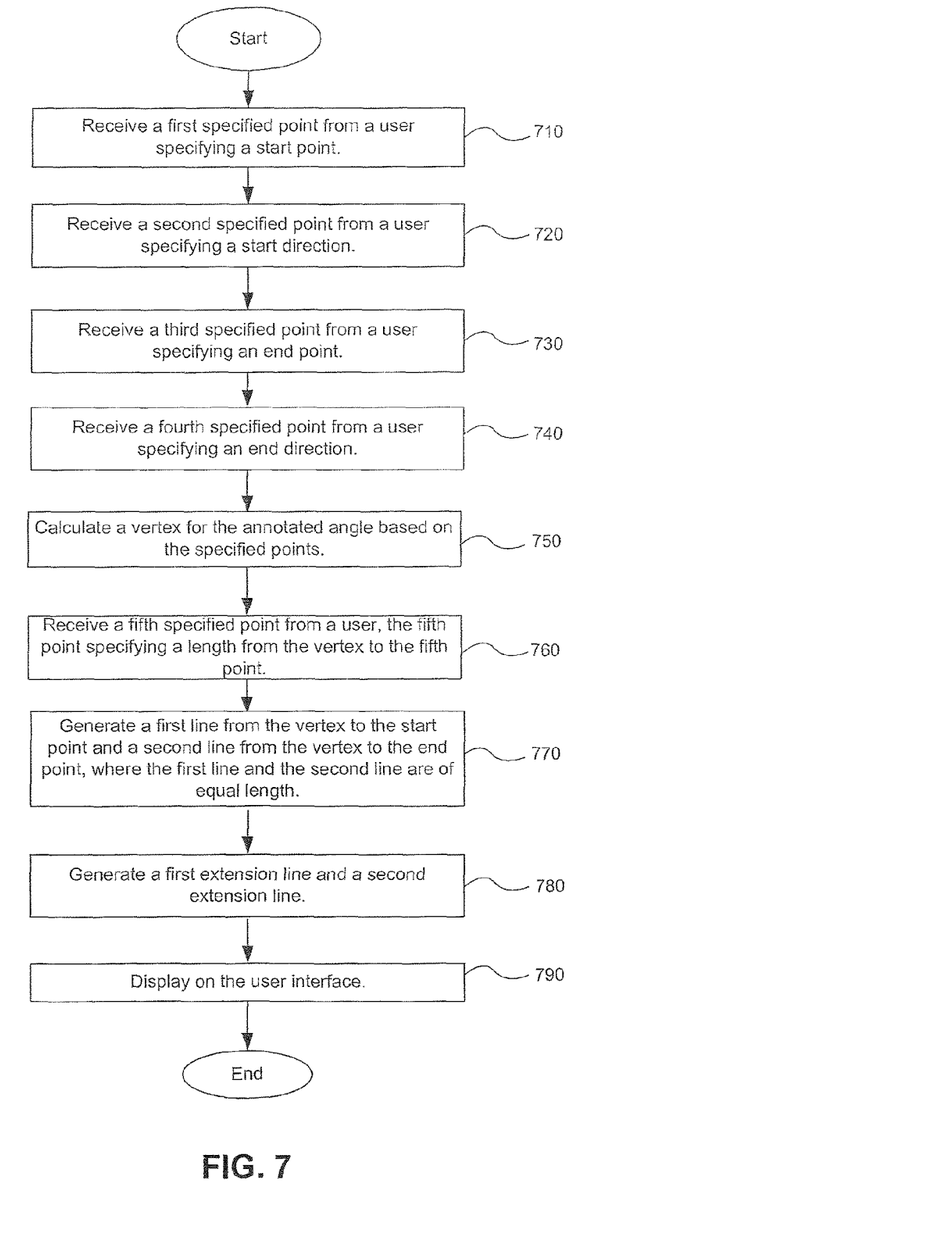
FIG. 7 illustrates a flowchart illustrating an exemplary aspect of operation for an annotated angle created by five user specified points, according to one embodiment.

This section and FIG. 7 summarizes one of the techniques described herein by presenting a flowchart of an exemplary method 700 of providing a user interface to faun an annotated angle from a plurality of user specified points where each user specified point may be received from a user. While, method 700 is described with respect to an embodiment of the present invention, method 700 is not meant to be limiting and may be used in other applications.

As shown in FIG. 7, an embodiment of method 700 begins at step 710 where the user specifies a first point. In an embodiment, as shown in FIG. 3, a first specified point, such as start point 102, is received from a user. Once step 710 is complete, method 700 proceeds to step 720.

At step 720, the user specifies a second point. In an embodiment, as shown in FIG. 3, a second specified point, such as start direction 202, is received from the user. Once step 720 is complete, method 700 proceeds to step 730.

At step 730, the user specifies a third point. In an embodiment, as shown in FIG. 3, a third specified point, such as end point 106, is received from the user. Once step 730 is complete, method 700 proceeds to step 740.

At step 740, the user specifies a fourth point. In an embodiment, as shown in FIG. 3, a fourth specified point, such as end direction 204, is received from the user. Once step 740 is complete, method 700 proceeds to step 750.

At step 750, a vertex for the annotated angle is calculated. In an embodiment as shown in FIG. 3, a vertex, such as vertex 114, is calculated for the annotated angle, such as annotated angle 110, based on the first specified point, such as start point 102, the second specified point, such as start direction 202, the third specified point, such as end point 106, and the fourth specified point, such as end direction 204. Once step 750 is complete, method 700 proceeds to step 760.

At step 760, the user specifies a fifth point. In an embodiment as shown in FIG. 3, a fifth specified point, such as extension line length point 118, the fifth point specifying a length from the vertex, such as vertex 114, to the fifth point, such as extension line length point 118. Once step 760 is complete, method 700 proceeds to step 770.

At step 770, a first line and a second line are generated for the annotated angle. In an embodiment as shown in FIG. 3, a first line, such as line 104 is generated from the vertex, such as vertex 114, to the start point, such as start point 102, and a second line, such as line 108, from the vertex, such as vertex 114, to the end point, such as end point 106, where the first line, such as line 104, and the second line, such as line 108, are of equal length. Once step 770 is complete, method 700 proceeds to step 780.

At step 780, extension lines are generated for the annotated angle. In an embodiment as shown in FIG. 3, a first extension line, such as extension line 130, of the first line, such as line 104, in the same direction as the first line, such as line 104, where the length of the first line, such as line 104, and first extension line, such as extension line 130, is equal to the length from the vertex, such as vertex 114, to the fifth point. A second extension line, such as extension line 132, of the second line, such as line 108, where the length of the second line, such as line 108, and second extension line, such as extension line 132, is equal to the length from the vertex, such as vertex 114, to the fifth point. Once step 780 is complete, method 700 proceeds to step 790.

At step 790, the annotated angle is displayed in the user interface. In an embodiment as shown in FIG. 3, the annotated angle, such as annotated angle 110, is displayed on the user interface, such as on user interface 300. When step 790 is completed, method 700 ends.

Embodiments can work with software, hardware, and/or operating system implementations other than those described herein. Any software, hardware, and operating system implementations suitable for performing the functions described herein can be used. Embodiments are applicable to both a client and to a server or a combination of both.

Method 800

Figure 8:
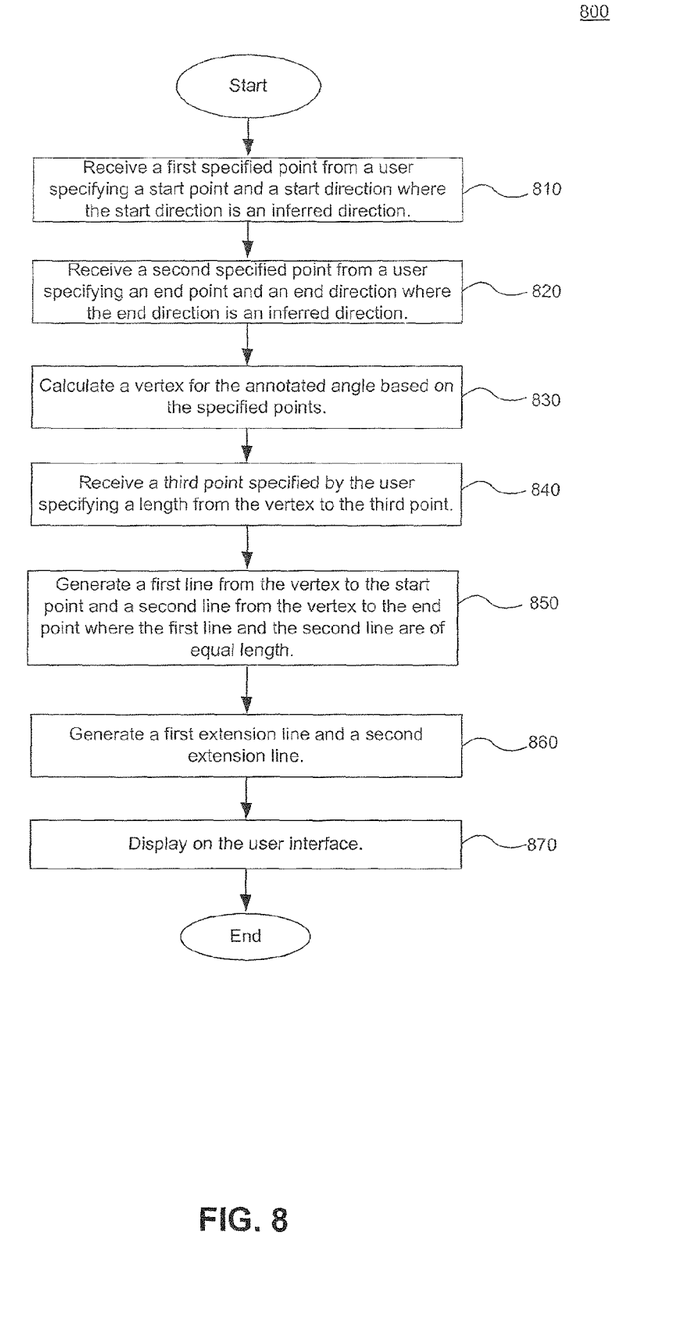
FIG. 8 illustrates one of the techniques described herein.

This section and FIG. 8 summarizes one of the techniques described herein by presenting a flowchart of an exemplary method 800 of providing a user interface to form an annotated angle from a plurality of user specified points where each user specified point may be received from a user. While, method 800 is described with respect to an embodiment of the present invention, method 800 is not meant to be limiting and may be used in other applications.

As shown in FIG. 8, an embodiment of method 800 begins at step 810 where the user specifies a first point. In an embodiment, as shown in FIG. 1, a first specified point, such as start point 102, is received from a user specifying the start point, such as start point 102, and a start direction where the start direction is an inferred direction. Once step 810 is complete, method 800 proceeds to step 820.

At step 820, the user specifies a second point. In an embodiment, as shown in FIG. 1, a second specified point, such as end point 106, is received from the user specifying the end point, such as end point 106, and an end direction where the end direction is an inferred direction. Once step 820 is complete, method 800 proceeds to step 830.

At step 830, a vertex for the annotated angle is calculated. In an embodiment as shown in FIG. 1, a vertex, such as vertex 114 is calculated for the annotated angle, such as annotated angle 110, based on the first specified point, such as start point 102 with inferred start direction, the second specified point, such as end point 106 with inferred end direction. Once step 830 is complete, method 800 proceeds to step 840.

At step 840, the user specifies a third point. In an embodiment as shown in FIG. 1, a third specified point, such as extension line length point 118, is received from the user, the third specified point, such as extension line length point 118, specifying a length from the vertex, such as vertex 114 to the third point, such as extension line length point 118. Once step 840 is complete, method 800 proceeds to step 850.

At step 850, a first line and a second line are generated for the annotated angle. In an embodiment as shown in FIG. 1, a first line, such as line 104 is generated from the vertex, such as vertex 114, to the start point, such as start point 102, and a second line, such as line 108, from the vertex, such as vertex 114, to the end point, such as end point 106, where the first line, such as line 104, and the second line, such as line 108, are of equal length. Once step 850 is complete, method 800 proceeds to step 860.

At step 860, extension lines are generated for the annotated angle. In an embodiment as shown in FIG. 1, a first extension line, such as extension line 130, of the first line, such as line 104, in the same direction as the first line, such as line 104, where the length of the first line, such as line 104, and first extension line, such as extension line 130, is equal to the length from the vertex, such as vertex 114, to the fifth point. A second extension line, such as extension line 132, of the second line, such as line 108, where the length of the second line, such as line 108, and second extension line, such as extension line 132, is equal to the length from the vertex, such as vertex 114, to the fifth point. Once step 860 is complete, method 800 proceeds to step 870.

At step 870, the annotated angle is displayed in the user interface. In an embodiment as shown in FIG. 1, the annotated angle, such as annotated angle 110 is displayed on the user interface, such as on user interface 100. When step 870 is completed, method 800 ends.

Embodiments can work with software, hardware, and/or operating system implementations other than those described herein. Any software, hardware, and operating system implementations suitable for performing the functions described herein can be used. Embodiments are applicable to both a client and to a server or a combination of both.

CONCLUSION

The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for providing a user interface to form an annotated angle from a plurality of points, each point specified by a user, comprising:

receiving a first point specified by a user, the first point specifying a start point and a start direction, wherein the start direction is determined by a first preexisting line that the user specified the start point on;

receiving a second point specified by the user, the second point specifying an end point and an end direction, wherein the end direction is determined by a second preexisting line that the user specified the end point on;

calculating a vertex for the annotated angle based on the first point and the second point;

generating a first line from the vertex to the start point and a second line from the vertex to the end point, wherein the first line and the second line are of equal length;

receiving a third point specified by a user, the third point specifying a length from the vertex to the third point;

generating a first extension line of the first line, in the same direction as the first line, wherein the length of the first line and first extension line is equal to the length from the vertex to the third point;

generating a second extension line of the second line, in the same direction as the second line, wherein the length of the second line and second extension line is equal to the length from the vertex to the third point; and displaying the annotated angle on the user interface.

2. The method of claim 1, wherein the length of the first extension line is equal to a difference between the distance from the third point to the vertex and the distance from the start point to the vertex.

3. A computer implemented method for providing a user interface to form an annotated angle from a plurality of points, each point specified by a user, comprising:

receiving a first point specified by a user, the first point specifying a start point;

receiving a second point specified by the user, the second point specifying a start direction;

receiving a third point specified by the user, the third point specifying an end point;

receiving a fourth point specified by the user, the fourth point specifying an end direction and a length of a pair of extension lines, wherein the length of the pair of extension lines is determined by the length of a previous pair of extension lines;

creating a first line extending from the first point in the start direction such that the first line extends through the first point and the second point;

creating a second line extending from the third point in the end direction such that the second line extends through the third point and the fourth point;

calculating a vertex for the annotated angle based on the first point, second point, third point, and the fourth point; and displaying the annotated angle on the user interface.

4. The method of claim 3, wherein the length of the pair of extension lines is determined by the length of the previous pair of extension lines by the user double-clicking for the fourth point.

5. A computer implemented method for providing a user interface to form an annotated angle from a plurality of points, each point specified by a user, comprising:

receiving a first point specified by a user, the first point specifying a start point;

receiving a second point specified by the user, the second point specifying a start direction;

receiving a third point specified by the user, the third point specifying an end point;

receiving a fourth point specified by the user, the fourth point specifying an end direction;

calculating a vertex for the annotated angle based on the first point, the second point, the third point, and the fourth point;

generating a first line from the vertex to the start point and a second line from the vertex to the end point, wherein the first line and the second line are of equal length;

receiving a fifth point specified by a user, the fifth point specifying a length from the vertex to the fifth point;

generating a first extension line of the first line, in the same direction as the first line, wherein the length of the first line and first extension line is equal to the length from the vertex to the fifth point;

generating a second extension line of the second line, in the same direction as the second line, wherein the length of the second line and second extension line is equal to the length from the vertex to the fifth point; and displaying the annotated angle on the user interface.

6. The method of claim 5, wherein an offset specifies a gap between the first line and the first extension line and the gap between the second line and the second extension line.

7. The method of claim 5, further comprising:

receiving a sixth point specified by the user, the sixth specified point specifying a start extent point, wherein the start extent point determines a first termination point for a dimension line; and receiving a seventh point specified by the user, the seventh point specifying an end extent point, wherein the end extent point determines a second termination point for the dimension line.

8. The method of claim 5, further comprising:

receiving the fifth point specified by the user, the fifth point established by the user clicking an inside of the annotated angle drawing an acute dimension line, wherein the acute dimension line is a shortest dimension line drawn between the pair of extension lines; and receiving the fifth point specified by the user, the fifth point established by the user clicking an outside of the annotated angle drawing an obtuse dimension line, wherein the obtuse dimension line is a longest dimension line drawn between the pair of extension lines.

9. The method of claim 8, wherein the user interface displays an angular dimension size corresponding to an angular dimension measurement for the dimension line drawn.

10. The method of claim 5, further comprising:

receiving an eighth point specified by the user where the user double clicked following a completion of the annotated angle, wherein the eighth point where the user double clicked sets a second end point for a second annotated angle;

establishing a second start point for the second annotated angle, wherein the end point for the annotated angle set by the third point specified by the user becomes the second start point for the second annotated angle; and establishing a second length of a second extension line for the second annotated angle, wherein the length of the extension line specified by the fifth point specified by the user becomes the second length of the second extension line.

11. A system for providing a user interface to form an annotated angle from a plurality of points, each point specified by a user, comprising:

a receiving module that receives:

a first point specified by a user, the first point specifying a start point and a start direction, wherein the start direction is determined by a first preexisting line that the user specified the start point on;

a second point specified by the user, the second point specifying an end point and an end direction, wherein the end direction is determined by a second preexisting line that the user specified the end point on;

a third point specified by the user, the third point specifying a length from a vertex to the third point;

a line generating module that generates:

a first line from the vertex to the start point and a second line from the vertex to the end point, wherein the first line and the second line are of equal length;

a first extension line of the first line, in the same direction as the first line, wherein the length of the first line and first extension line is equal to the length from the vertex to the third point;

a second extension line of the second line, in the same direction as the second line, wherein the length of the second line and second extension line is equal to the length from the vertex to the third point;

a calculating module that calculates the vertex for the annotated angle based on the first point and the second point; and a display module that displays the annotated angle on the user interface.

12. The system of claim 11, wherein the length of the first extension line is equal to a difference between the distance from the third point to the vertex and the distance from the start point to the vertex.

13. A system for providing a user interface to form an annotated angle from a plurality of points, each point specified by a user, comprising:

a receiving module that receives:

a first point specified by the user, the first point specifying a start point;

a second point specified by the user, the second point specifying a start direction;

a third point specified by the user, the third point specifying an end direction;

a fourth point specified by the user, the fourth point specifying an end point and a length of a pair of extension lines, wherein the length of the pair of extension lines is determined by the length of a previous pair of extension lines;

a generating module that generates:

a first line extending from the first point in the start direction such that the first line extends through the first point and the second point;

a second line extending from the third point in the end direction such that the second line extends through the third point and the fourth point;

a calculating module that calculates a vertex for the annotated angle based on the first point, second point, third point, and the fourth point; and a display module that displays the annotated angle on the user interface.

14. The system of claim 13, wherein the length of the pair of dimension lines is determined by the length of the previous pair of dimension lines by the user double-clicking for the fourth point.

15. A system for providing a user interface to form an annotated angle from a plurality of points, each point specified by a user, comprising:

a receiving module that receives:

a first point specified by a user, the first point specifying a start point;

a second point specified by the user, the second point specifying a start direction;

a third point specified by the user, the third point specifying an end point;

a fourth point specified by the user, the fourth point specifying an end direction;

a fifth point specified by the user, the fifth point specifying a length from a vertex to the fifth point;

a generating module that generates:

a first line from the vertex to the start point and a second line from the vertex to the end point, wherein the first line and the second line are of equal length;

a first extension line of the first line, in the same direction as the first line, wherein the length of the first line and first extension line is equal to the length from the vertex to the fifth point;

a second extension line of the second line, in the same direction as the second line, wherein the length of the second line and second extension line is equal to the length from the vertex to the fifth point;

a calculation module that calculates the vertex for the annotated angle based on the first point, the second point, the third point, and the fourth point; and a display module that displays the annotated angle on the user interface.

16. The system of claim 15, wherein an offset specifies a gap between the first line and the first extension line and the gap between the second line and the second extension line.

17. The system of claim 15, wherein the receiving module further receives:

a sixth point specified by the user, the sixth point specifying a start extent point, wherein the start extent point determines a first termination point for a dimension line; and a seventh point specified by the user, the seventh point specifying an end extent point, wherein the end extent point determines a second termination point for the dimension line.

18. The system of claim 15, wherein:

the fifth point is established by the user clicking on an inside of the annotated angle drawing an acute dimension line, wherein the acute dimension line is a shortest dimension line drawn between an end extent point and a start extent point, and the fifth point is established by the user clicking on an outside of the annotated angle drawing an obtuse dimension line, wherein the obtuse dimension line is a longest dimension line drawn between the end extent point and the start extent point.

19. The system of claim 16, wherein the user interface displays an angular dimension size corresponding to an angular dimension measurement for the dimension line drawn.

20. The system of claim 15, further comprising:

the receiving module that receives an eighth point specified by the user where the user double clicks following a completion of the annotated angle, wherein the eighth point where the user double clicks sets a second end point for a second annotated angle;

an establishment module that establishes upon receiving the eighth point:

a second start point for the second annotated angle, wherein the end point for the annotated angle specified by the third point becomes the second start point for the second annotated angle; and the second length of a second extension line for the second annotated angle, wherein the length of the extension line specified by the fifth point becomes the second length of the second extension line.

* * * * *